United States Patent
Hosseini

(10) Patent No.: US 9,826,713 B2
(45) Date of Patent: Nov. 28, 2017

(54) ANIMAL MUZZLE PATTERN SCANNING DEVICE

(71) Applicant: Hadi Hosseini, Los Angelse, CA (US)

(72) Inventor: Hadi Hosseini, Los Angelse, CA (US)

( * ) Notice: Subject to any disclaimer, the term of this patent is extended or adjusted under 35 U.S.C. 154(b) by 0 days.

(21) Appl. No.: 14/969,511

(22) Filed: Dec. 15, 2015

(65) Prior Publication Data

US 2016/0095292 A1    Apr. 7, 2016

(51) Int. Cl.
*H04N 7/18* (2006.01)
*A01K 11/00* (2006.01)
*G06K 9/00* (2006.01)
*H04N 1/00* (2006.01)
*H04N 5/225* (2006.01)

(52) U.S. Cl.
CPC ........ *A01K 11/006* (2013.01); *G06K 9/00362* (2013.01); *H04N 1/00209* (2013.01); *H04N 5/2252* (2013.01)

(58) Field of Classification Search
CPC ............. A01K 11/006; H04N 5/23216; H04N 1/00209; H04N 5/23293; H04N 5/2258; G06K 9/00671; G06K 9/00362; G06K 9/228; G06K 9/6202
USPC ................................. 348/61, 161; 382/110
See application file for complete search history.

(56) References Cited

U.S. PATENT DOCUMENTS

| | | | | |
|---|---|---|---|---|
| 2004/0153477 | A1* | 8/2004 | Meadows | A01K 11/00 |
| 2007/0229850 | A1* | 10/2007 | Herber | G01B 11/25 |
| | | | | 356/604 |
| 2013/0142398 | A1* | 6/2013 | Polimeno | G06K 9/00221 |
| | | | | 382/110 |
| 2013/0148898 | A1* | 6/2013 | Mitura | G06K 9/62 |
| | | | | 382/195 |
| 2014/0352632 | A1* | 12/2014 | McLaughlin | A01K 11/008 |
| | | | | 119/721 |
| 2015/0078626 | A1* | 3/2015 | Kinard | G06K 9/6201 |
| | | | | 382/110 |

* cited by examiner

*Primary Examiner* — Jared Walker
(74) *Attorney, Agent, or Firm* — Barry Choobin; Patent 360

(57) ABSTRACT

A handheld device for scanning a muzzle pattern of an animal, the device comprising: a scanning segment configured to fit over the muzzle of the animal and a plurality of scanning cameras attached to the scanning segment for capturing the muzzle pattern from different angles. The device further comprises an image processor for combining and processing scanned muzzle patterns from the plurality of scanning cameras and displaying the processed muzzle pattern on an image viewer. A handle segment comprising a plurality of control buttons and a communication interface for connecting and transferring data to an external device.

17 Claims, 12 Drawing Sheets

__US 9,826,713 B2__

ANIMAL MUZZLE PATTERN SCANNING DEVICE

BACKGROUND

1. Field of the Invention

The present invention generally relates to systems, devices and methods for identifying pet animals and for all animals having a muzzle, and more particularly relates to a device and method for scanning muzzle patterns of an animal and using the muzzle pattern as a unique identifier of the animal.

2. Description of Related Art

Animal identification systems are required to create and record a unique identifier for each animal which would be helpful in identifying lost pets, transportation of animals and preventing animal theft and endangered animal contraband. Different techniques are used for unique identification of animals which include traditional methods of marking animals such as branding (using heat, cold or chemicals), tattooing, toe clipping and ear notching. The traditional marking procedures are time consuming, expensive and involves tissue damage which causes pain to animals and therefore ethically unacceptable.

Another method of marking involves tagging animal ears with RFID tags. These methods of tagging can potentially affect their behavior and cause harm to animals, leading to erroneous research results and poor animal welfare. In some cases, microchips are implanted in the animal body which can be used for identification and collecting physiological data. However, these implanted microchips pose limitations due to migration or failure of microchip and may cause side effects including hair loss, infection, inflammation and tumor formation in animals. An ideal method of identification should identify individuals reliably and permanently without any adverse effects on the animals.

Biometric methods have therefore been developed to recognize animals based on physical characteristics or behavioral signs. Some of these methods have been used for some time for reliable identification of humans. The tip of the nose or muzzle of most animals has unique pattern or a network of tiny growth that are formed in the epidermis layer of the skin. This unique pattern becomes fixed right after the birth of the animal and can be seen with naked eyes. This animal specific muzzle pattern could be used for identification just like finger print pattern of human beings.

Therefore, there exists a need in the art for a device and method for identification and registration of animals using a unique identifier based on physical characteristic specific to each animal.

SUMMARY OF THE INVENTION

The present invention relates to a handheld device for scanning a muzzle pattern of an animal, the device comprising a scanning segment configured to fit over the muzzle of the animal. A plurality of scanning cameras attached to the scanning segment for capturing the muzzle pattern from different angles and an image processor for combining and processing scanned muzzle patterns from the plurality of scanning cameras and displaying the processed muzzle pattern on an image viewer. The device further comprises a handle segment with a plurality of control buttons and a communication interface for connecting to an external device.

In one embodiment, the present invention relates to a method of obtaining a muzzle pattern of an animal, the method comprising the steps of: i) providing a handheld device for scanning the muzzle pattern; ii) placing the handheld device over the muzzle of the animal; iii) pressing a scan button to capture the muzzle pattern by a plurality of scanning cameras; iv) viewing the processed muzzle pattern in an image viewer, wherein the captured muzzle patterns from scanning cameras are processed by an image processor; and v) saving the processed muzzle pattern in a local memory of the handheld device. The method may further comprise transferring the processed muzzle pattern to an external device through a wired or wireless communication interface.

In another embodiment, the present invention relates to a system for registering and identification of animals based on unique identification features, the system comprising: a handheld device for capturing images of muzzle pattern and an eye of an animal and preprocessing the captured images; an external device for connecting with the handheld device and uploading the preprocessed images to a central server through a communication network; wherein the central server conducts a pattern recognition analysis between the uploaded preprocessed images and existing images in a database and communicates a result of the analysis to the external device or the handheld device.

In an alternate embodiment, the handheld device for scanning animal muzzle pattern can be integrated with a food container, especially an animal food container. The handheld device is attached to the animal food container in such a way that the cover of the food container will open only after scanning the muzzle pattern of the animal. The scanning segment is attached to a top edge of the food container containing animal food and comprises an opening below the scanning segment, from which the smell of the food comes out. When animal gets close to the opening which acts as a source of food smell, its muzzle gets successfully scanned, and if the muzzle pattern matches with the preset instructions in the device, the cover of the food container will automatically open.

BRIEF DESCRIPTION OF DIFFERENT VIEWS OF DRAWINGS

DETAILED DESCRIPTION OF DIFFERENT EMBODIMENTS

The terms "muzzle pattern", "nose print", "muzzle print" are used interchangeably herein, refers to the unique pattern formed in the epidermis layer of the skin on muzzle region of animals.

The terms "handheld device", "muzzle scanner", are used interchangeably herein, refers to the device used for capturing the muzzle pattern of animals.

Figure 1A:
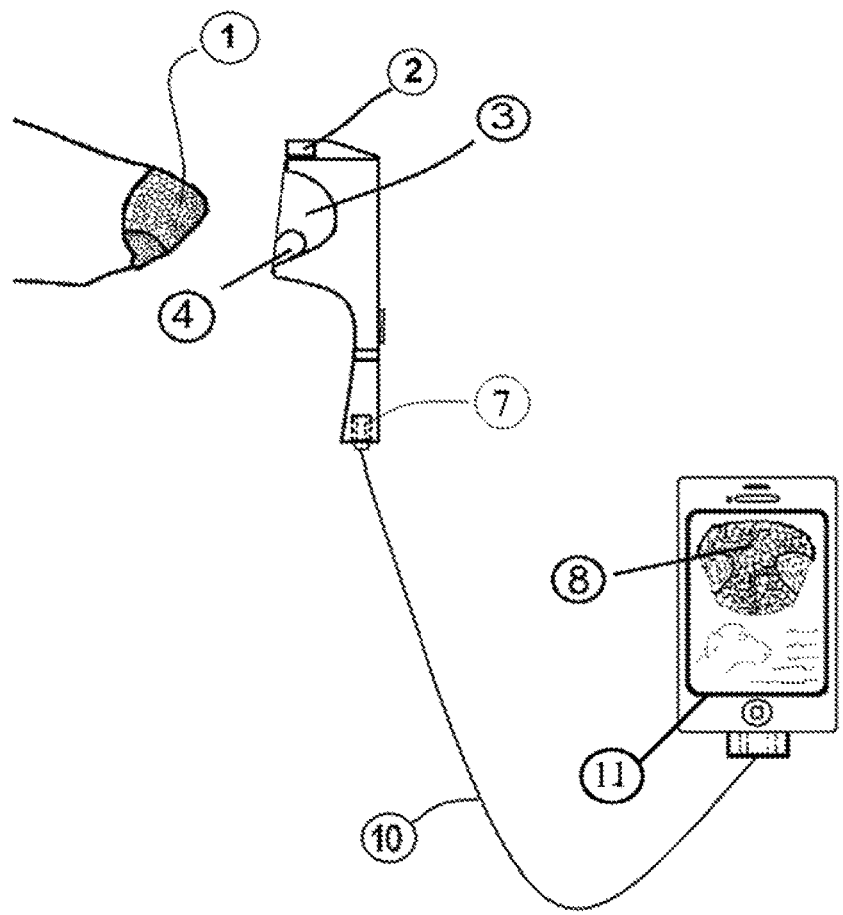
FIG. 1A is a side view of the handheld device for scanning a muzzle pattern of an animal.
Figure 1B:
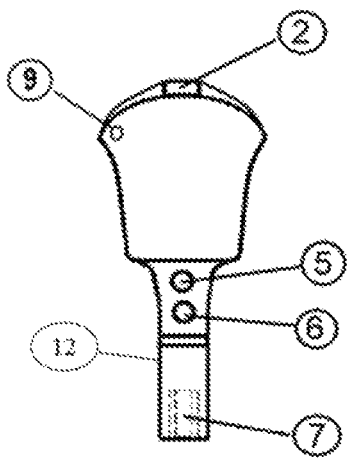
FIG. 1B is a front view of the handheld device for scanning the muzzle pattern of the animal.

FIGS. 1A and 1B shows a side view and front view respectively of the handheld device for scanning a muzzle pattern of an animal. The handheld device comprises a scanning segment 3 which is configured to fit over the muzzle 1 of the animal, for ex: a dog. The handheld device further comprises a plurality of scanning cameras (not shown) attached to the scanning segment 3 for capturing the muzzle pattern of the animal from different angles. The handheld device comprises a handle segment 12 with a plurality of control buttons including a camera button 5, a scan button 6. The handle segment 12 further comprise a communication interface 7 for connecting to an external device 11.

The captured images of muzzle pattern from the scanning cameras may be combined and preprocessed within the handheld device or transferred to an external device 11 through a connecting cable 10 connected to the communication interface 7. The preprocessed image 8 showing the muzzle pattern can be viewed using the external device 11. In an embodiment, the external device may comprise a mobile device, smartphone, laptop, tablet PC, Personal digital assistant (PDA) and desktop computer. The communication interface 7 may comprise a USB port. In an embodiment, the communication interface 7 may comprise a wireless interface using technologies such as Bluetooth, Infrared, and the like. In an embodiment, the handheld device is connected to a communication network such as an internet network.

The handheld device further comprises an additional camera 2 for capturing still images and videography of the animal. The scanning segment 3 further comprises an air vent 4 which allows circulation of breathing air, which prevents causing uneasiness to the animal while capturing its muzzle pattern. The handheld device comprises a visual indicator 9 for indicating satisfactory scanning of the muzzle pattern. In an embodiment, the visual indicator 9 comprises a light source configured to emit green light when the scanned muzzle patterns are satisfactory and emit red light when the scanned muzzle patterns are not satisfactory.

Figure 2:
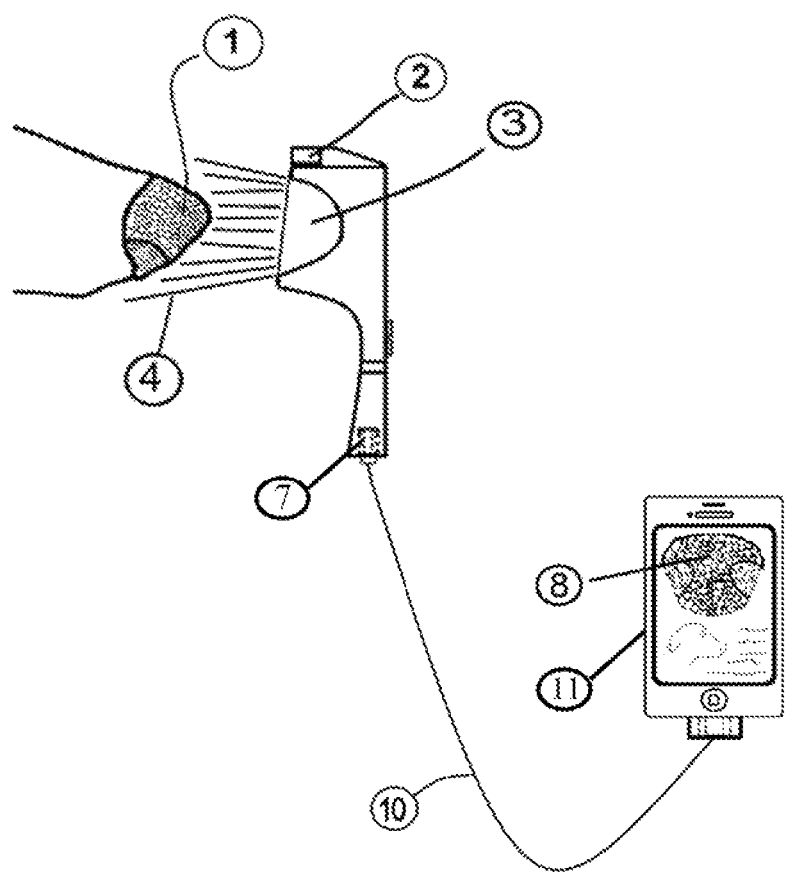
FIG. 2 is a side view of the handheld device connected to an external device, according to a different embodiment.

FIG. 2 shows a side view of the handheld device according to a different embodiment. The handheld device comprises one or more scanning light sources (not shown) configured to emit light beams 4 for scanning the muzzle pattern, without having the need to place the scanning segment 3 over the muzzle 1 of the animal. The light beams 4 from the scanning light source are emitted toward the animal muzzle 1 and then the light gets reflected back toward the scanning cameras for capturing the muzzle pattern. The handheld device further comprises the additional camera 2 for capturing still images and moving images of the animal. The preprocessed image 8 showing the muzzle pattern can be viewed using the external device 11 connected using the cable 10 to the communication interface 7. This configuration is useful for scanning the muzzle pattern in animals which are difficult to handle.

Figure 3A:
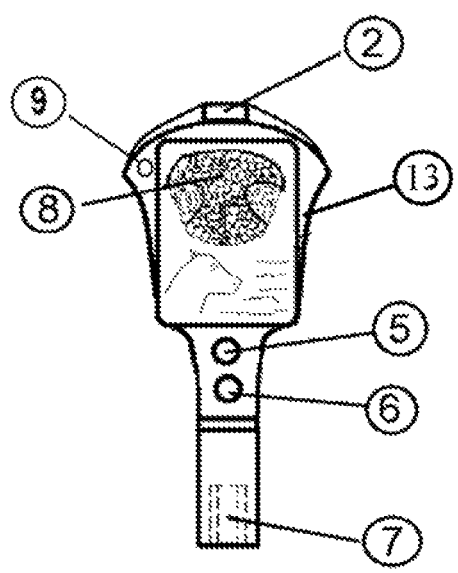
FIG. 3A is a front view of the handheld device with an image viewer.
Figure 3B:
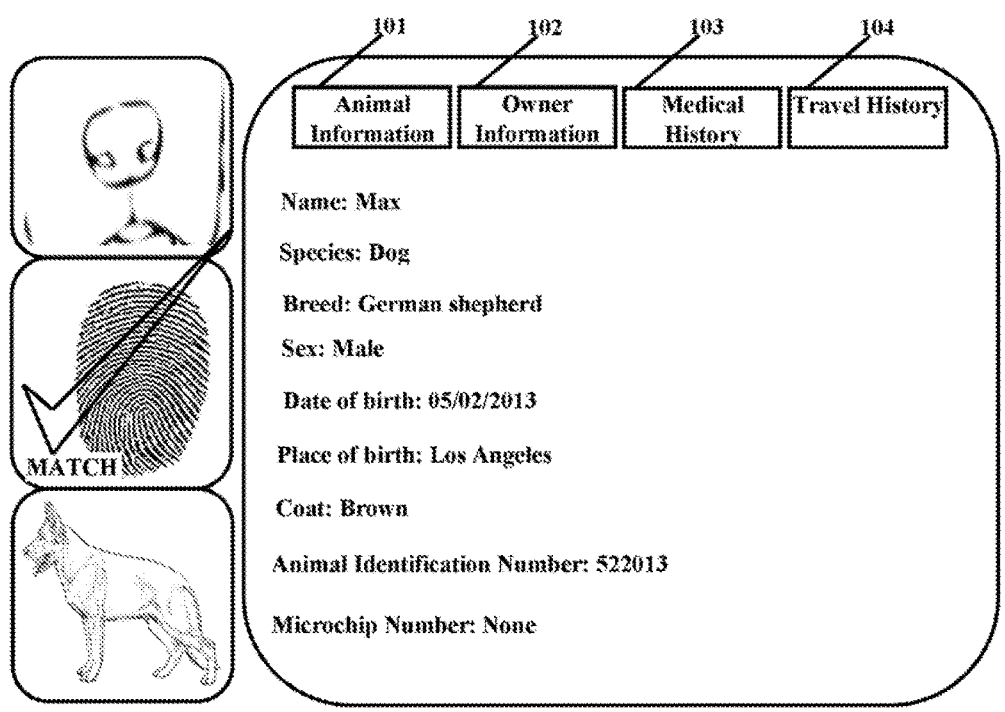
FIG. 3B is an exemplary image of the image viewer showing a matching record.
Figure 3C:
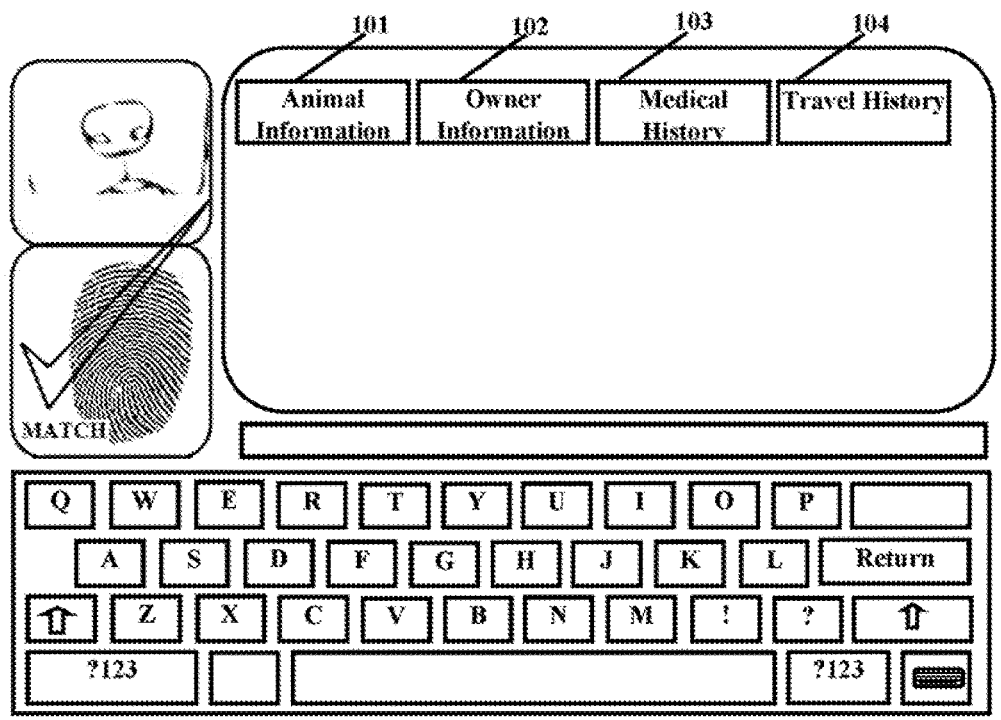
FIG. 3C is an exemplary image of the image viewer showing an editable record.

FIG. 3A shows a front view of the handheld device according to a different embodiment. The handheld device comprises an image viewer 13 on the front side, which shows the preprocessed image 8 of the muzzle pattern. The device further comprises an image processor for combining and processing scanned muzzle patterns from the plurality of scanning cameras and displaying the processed image 8 of the muzzle pattern on the image viewer 13. The device further comprises a visual indicator 9, additional camera 2, control buttons 5, 6 and connecting interface 7. FIG. 3B and FIG. 3C are exemplary images of the image viewer 13 showing a matching record and an editable record respectively. The matching record and the editable record may comprise details such as animal information 101, owner information 102, medical history 103 and travel history 104. In an embodiment, the image viewer 13 comprises a touch screen control.

Figure 4:
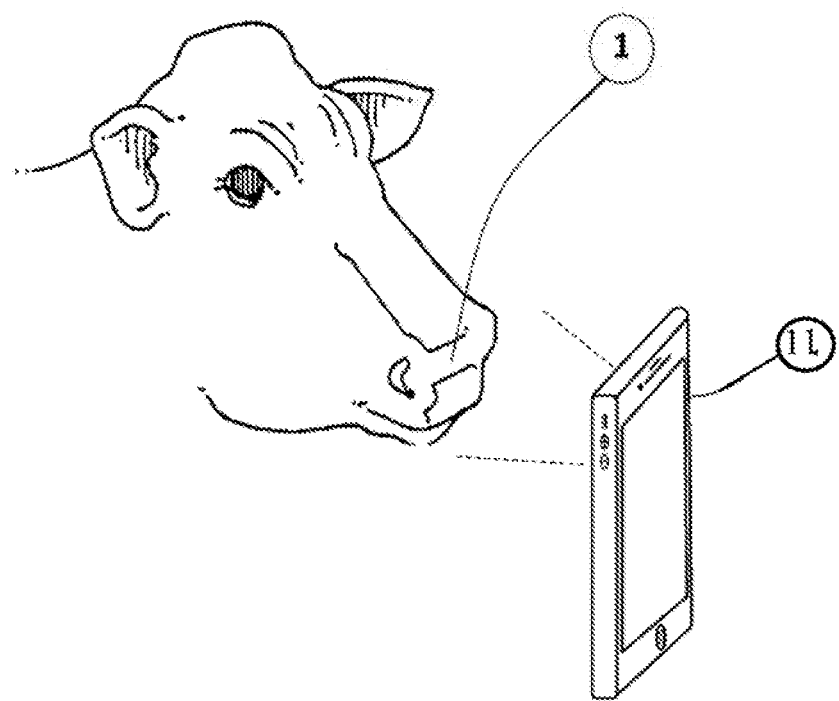
FIG. 4 shows a muzzle pattern of the animal directly captured using an external device.
Figure 5:
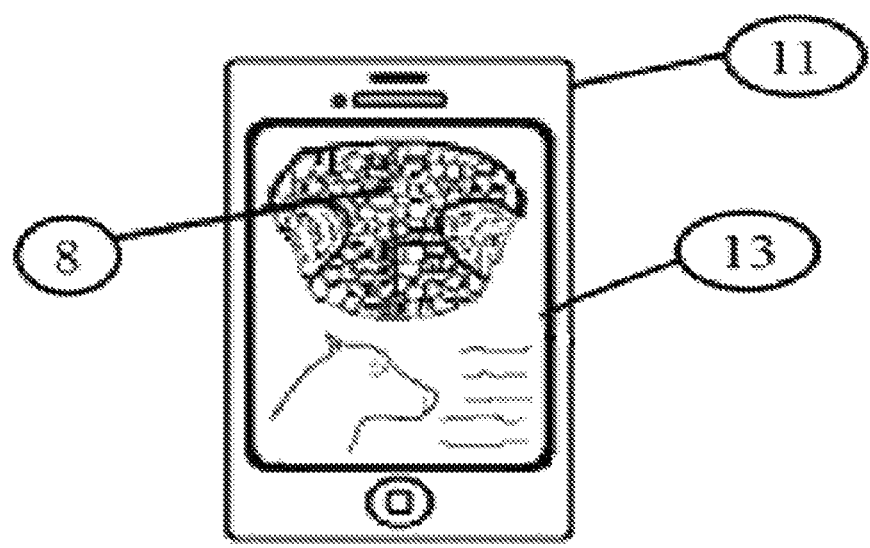
FIG. 5 is a front view of the mobile device with an application for muzzle pattern identification.

In an alternative embodiment, the muzzle pattern of an animal can be directly captured using the external device 11, such as a mobile phone or a smartphone device equipped with a camera. FIG. 4 shows the muzzle 1 of a cow captured using a smartphone 11. The mobile device or smartphone 11 is equipped with a mobile application configured to detect muzzle patterns of the animal. FIG. 5 illustrates a front view of the external device 11 installed with an application 13 for muzzle pattern identification. The processed image 8 of the muzzle pattern can be viewed using the application 13. The mobile application functions similar to the image viewer showing a matching record and an editable record as shown in FIG. 3B and FIG. 3C respectively. In an embodiment, the mobile device or smartphone 11 is connected to an internet network.

The muzzle pattern or nose print are specific for each animal and could be used as unique identification just like finger print for human beings. This unique pattern becomes fixed right after the birth of the animal and not even twin animals would ever have the same exact muzzle pattern.

In an embodiment, the present invention relates to a method of obtaining a muzzle pattern of an animal, the method comprising the steps of: a) providing a handheld device for scanning the muzzle pattern; b) placing the handheld device over the muzzle of the animal; c) pressing a scan button to capture the muzzle pattern by a plurality of scanning cameras; d) viewing the processed muzzle pattern in an image viewer, wherein the captured muzzle patterns from scanning cameras are processed by an image processor; and e) saving the processed muzzle pattern in a local memory of the handheld device. The method may further comprise further comprises transferring the processed muzzle pattern to an external device through a communication interface. In one embodiment, the communication interface comprises a wired connecting interface such as a USB port or a wireless connecting interface such as Bluetooth, Infrared. The external device may comprise a mobile device, smartphone, laptop, tablet PC, Personal digital assistant (PDA) and desktop computer.

Figure 6:
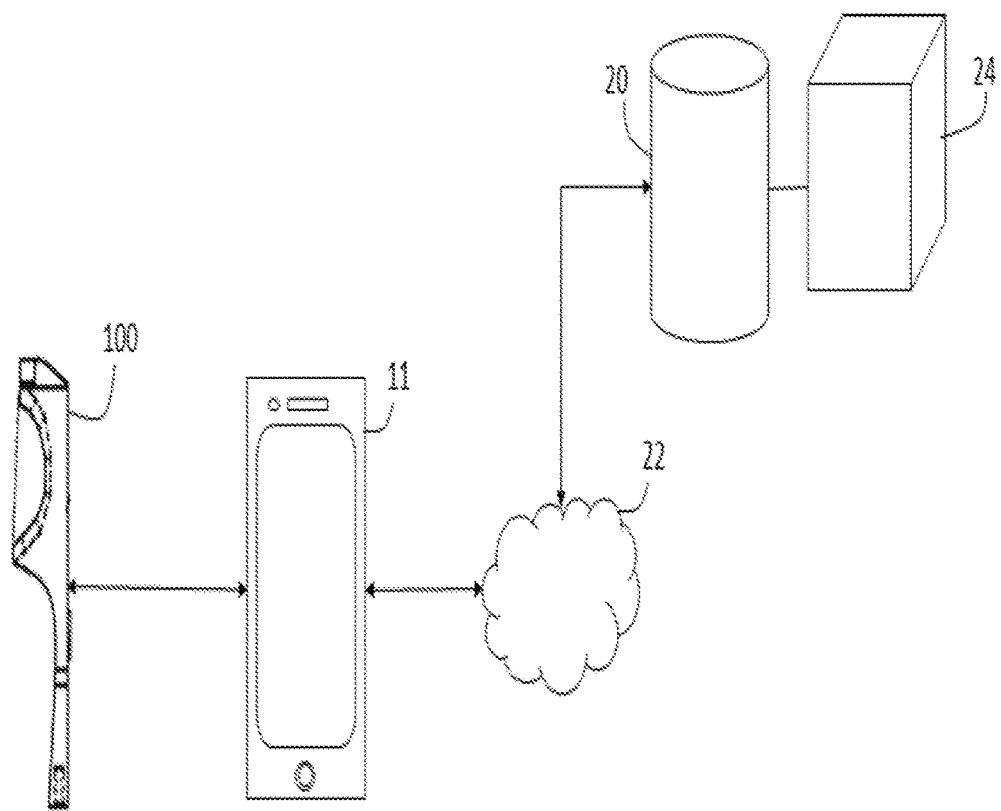
FIG. 6 is a schematic diagram of a system for registering and identification of animals.

FIG. 6 shows a schematic diagram of a system for registering and identification of animals based on unique identifying features. The system comprises a handheld device 100 for capturing images of muzzle pattern and an eye of an animal and preprocessing the captured images. An external device 11 for connecting with the handheld device 100 and uploading the preprocessed images to a central server 20 through a communication network 22. The central server 20 conducts a pattern recognition analysis between the uploaded preprocessed images and existing images in a database 24 and communicates a result of the analysis to the external device 11 or the handheld device 100. The communication network 22 comprises an internet network.

The central server 20 further allows modification of an existing image in the database 24, if a matching record with one or more similar images are found as a result of the pattern recognition analysis. The central server 20 allows addition of a new record, if no matching record consisting similar images are found in the database 24. Animals including cattle and pets can be registered in veterinary clinics, authorized animal shelters, pet stores and official centers of global animal registration system.

Figure 7A:
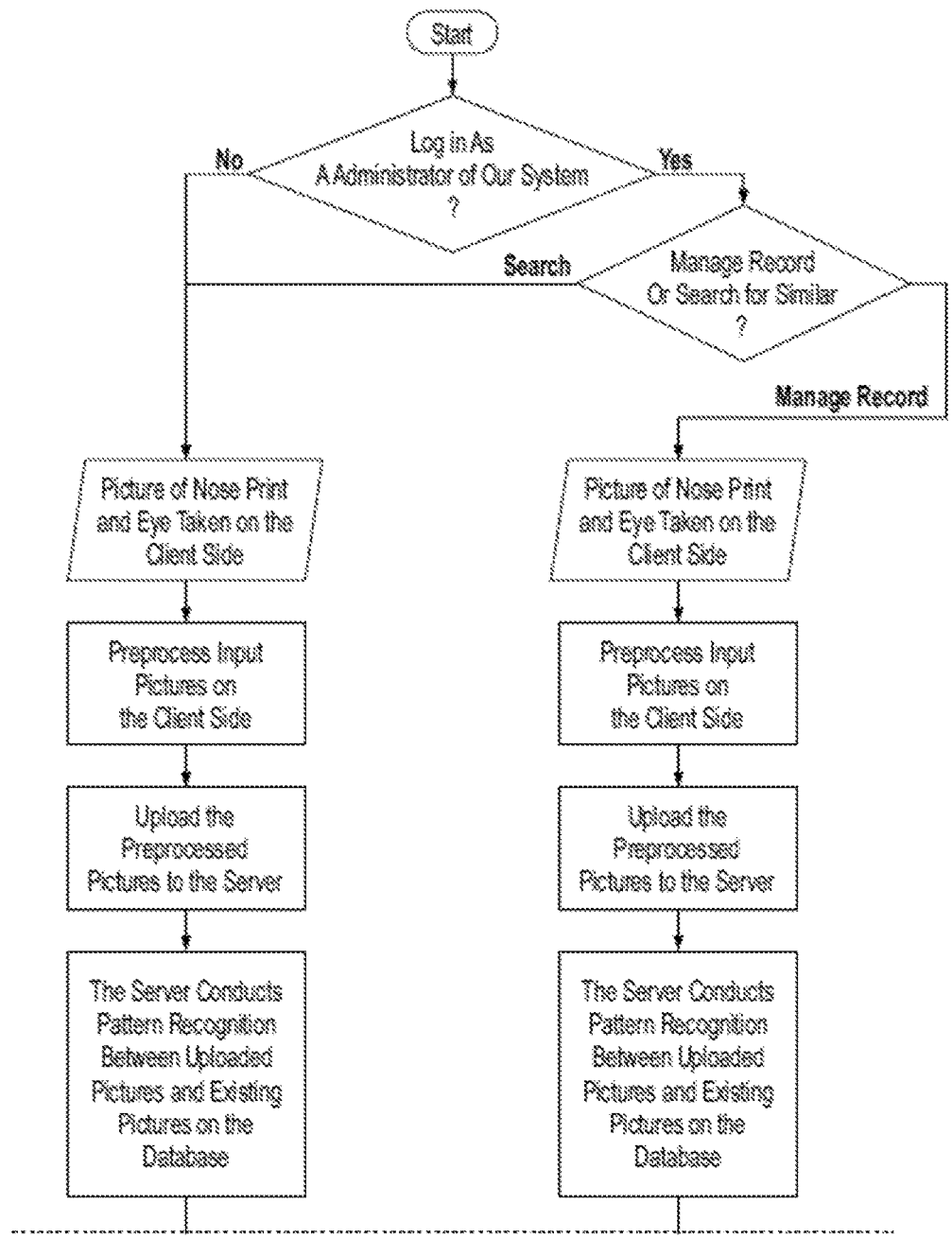
FIG. 7A is a first partial view of a flowchart illustrating a method of adding and modifying a record in animal registration system database.
Figure 7B:
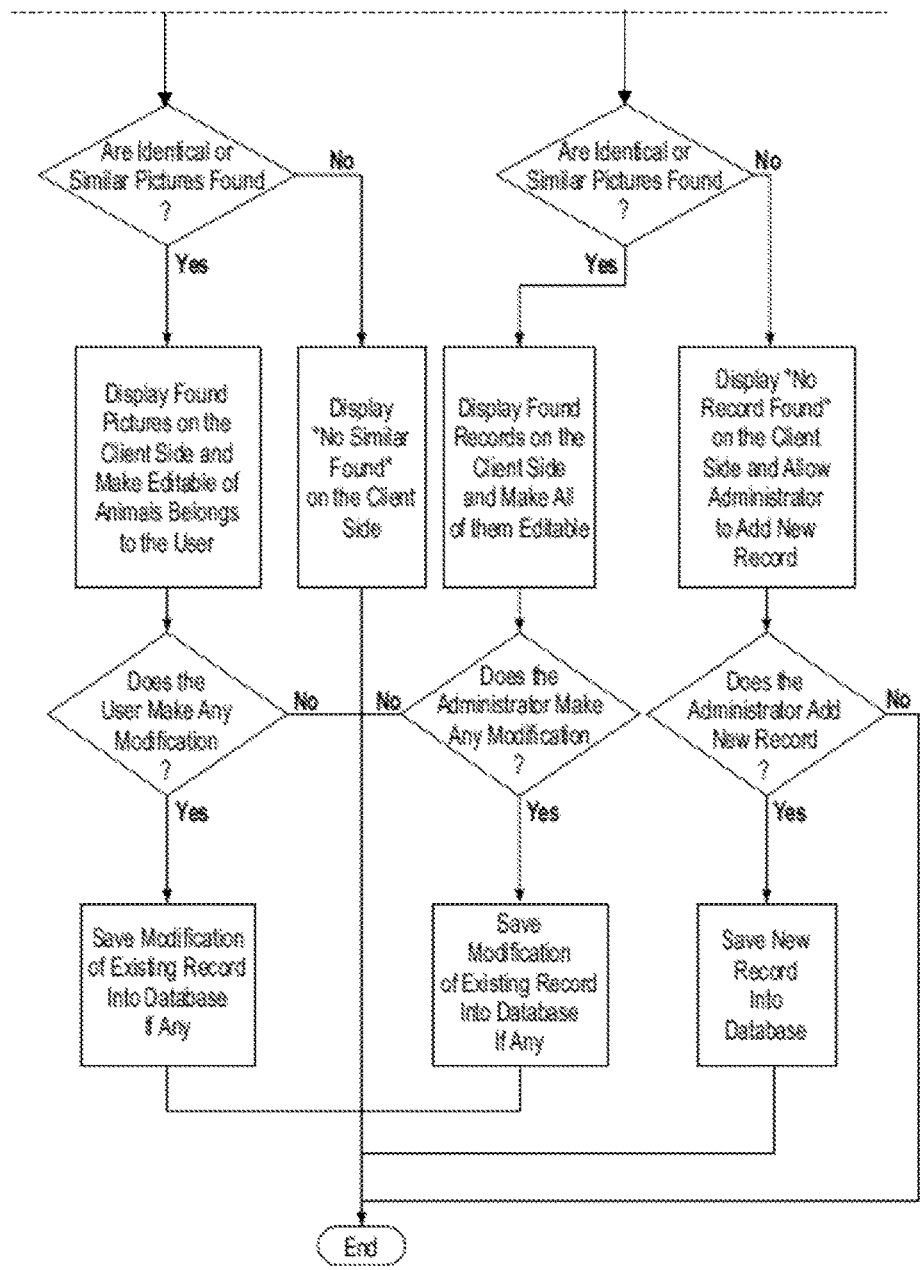
FIG. 7B is a second partial view of the flowchart.

FIGS. 7A and 7B illustrates a flowchart for a method of adding or modifying a record in the database of the system for registering and identification of animals. The system firstly confirms the identity of the user. If they are administrators, they can modify and also search for records. If they are guest users, they can only search for animals After start, logging in as an administrator of the system 30, the administrator is prompted for manage a record or search for similar record 31. In order to manage and search the record the following steps are common, which involves taking pictures of nose print and eye at client side 32, preprocessing input pictures on the client side 33, uploading the preprocessed pictures to the server 34, the server conducting pattern recognition between uploaded pictures and existing pictures on the database 35, whether identical or similar pictures found 36 and displaying feedback.

For administrator, in case of identical or similar images being found, displaying found records and making all of the record editable 37, checking whether administrator make any modification 38 and save the modification of existing record into the database 39. In case of no identical or similar images, display "no record found" on the client side and allow administrator to add a new record 40, check if administrator added new record 41 and save new record into database 42.

For a guest user of the system and for the administrator searching for similar records, in case of identical or similar images are found, displaying found pictures on the client side and making data editable only for animals belong to user 43, checking whether user make any modification 44 and saving the modification of existing record into database 45. In case of no identical or similar images, display "no record found" on the client side 46.

Figure 8:
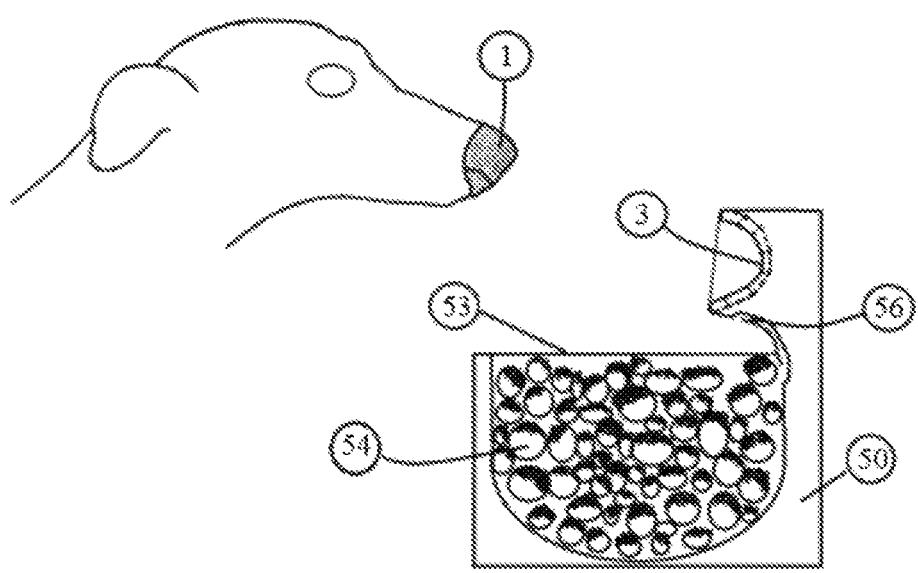
FIG. 8 shows a muzzle pattern scanning device attached to an animal food container.

In an alternate embodiment, the handheld device for scanning animal muzzle pattern can be integrated with a food container, especially an animal food container 50 as shown in FIG. 8. The handheld device is attached to the animal food container 50 in such a way that the cover 53 of the food container 50 will open only after scanning the muzzle pattern 1 of the animal. The scanning segment 3 is attached to a top edge of the food container 50 containing animal food 54 and comprises an opening 56 below the scanning segment 3, from which the smell of the food 54 comes out. When animal gets close to the opening 56 which acts as a source of food smell, its muzzle gets successfully scanned, and if the muzzle pattern matches with the preset instructions in the device, then the cover 53 of the food container will automatically open. Animal food containers can be designed with muzzle pattern scanning device attached to it, in order to selectively feed one or more animals among a group.

The handheld device for scanning animal muzzle pattern can be used in various areas such as animal hospitals, veterinary clinics, animal care centers, animal producers, animal treatment centers, zoos, environmental ranger offices, animal sales stores, slaughterhouses, airports, farms, animal research centers and law enforcement agencies. The animal registration and identification system in combination with the muzzle pattern scanning device can be used: a) to prevent animal theft and to help law enforcement officers to easily identify stolen animals; b) to find out lost animals or pets and connecting the lost animals with owners; and c) to create identification data and associate medical history of animals with the identification data.

In an exemplary embodiment, the animal doctors could use this device to scan an animal muzzle pattern to create an initial identification card including an image of the scanned muzzle along with information such as photos, animal name, animal owner's name, age, weight, height, width, disease, medicine, treatment, injections, labs, etc. This identification record can then be transferred to a main computer or a central server for further processing and future reference. Further, owners of the stolen animals can provide the IDs of the stolen animals to the law enforcement officers. Then, the officers could use this device to identify the stolen animals.

What is claimed is:

1. A handheld device for scanning a muzzle pattern of an animal, the device comprising:
  a scanning segment configured to fit over the muzzle of the animal;
  a plurality of scanning cameras attached to the scanning segment for capturing the muzzle pattern from different angles;
  an image processor for combining and processing scanned muzzle patterns from the plurality of scanning cameras and displaying the processed muzzle pattern on an image viewer; and
  a handle segment comprising a plurality of control buttons and a communication interface for connecting to an external device
  wherein the scanning segment comprises an air vent for breathing air circulation.

2. The handheld device of claim 1, further comprises a camera for capturing still images and moving images of the animal.

3. The handheld device of claim 1, further comprises a visual indicator for indicating satisfactory scanning of muzzle patterns.

4. The handheld device of claim 3, wherein the visual indicator comprises a light source configured to emit green light when the scanned muzzle patterns are satisfactory and emit red light when the scanned muzzle patterns are not satisfactory.

5. The handheld device of claim 1, wherein the communication interface comprises a USB port or a wireless interface.

6. The handheld device of claim 1, wherein the external device comprises a mobile device, smartphone, laptop, tablet PC, Personal digital assistant (PDA) and desktop computer.

7. The handheld device of claim 1, wherein the scanning segment is made of a transparent material.

8. The method of claim 1, further comprises a scanner light source configured to emit light towards the muzzle.

9. The handheld device of claim 1, wherein the image viewer comprises a touch screen.

10. A computer implemented method comprising instructions stored on a non-transitory computer readable storage medium and run on a hand held computing device comprising memory and a hardware processor for obtaining a muzzle pattern of an animal, the method comprising the steps of:

scanning the muzzle pattern with the hand held computing device;

pressing a scan button to capture the muzzle pattern by a plurality of scanning cameras;

viewing the processed muzzle pattern in an image viewer, wherein the captured muzzle patterns from scanning cameras are processed by an image processor;

saving the processed muzzle pattern in a local memory of the handheld device; and modifying an existing image in a database, when one or more similar images are found as a result of a pattern recognition analysis.

11. The method of claim 10, further comprises transferring the processed muzzle pattern to an external device through a communication interface.

12. The method of claim 11, wherein the communication interface comprises a wired or a wireless connecting interface.

13. The method of claim 11, wherein the external device comprises a mobile device, smartphone, laptop, tablet PC, Personal digital assistant (PDA) and desktop computer.

14. A system for registering and identification of animals based on unique identification features, the system comprising:

a handheld device for capturing images of muzzle pattern and an eye of an animal and pre-processing the captured images;

an external device for connecting with the handheld device and uploading the pre-processed images to a central server through a communication network;

wherein the central server conducts a pattern recognition analysis between the uploaded pre-processed images and existing images in a database and communicates a result of the analysis to the external device or the handheld device, and wherein the central server allows modification of an existing image in the database, when one or more similar images are found as a result of the pattern recognition analysis.

15. The system of claim 14, wherein the central server allows addition of a new record, if no similar images are found in the database.

16. A computer implemented method comprising instructions stored on a non-transitory computer readable storage medium and run on a mobile device comprising memory and a hardware processor for muzzle pattern identification of an animal, the method comprising steps of:

detecting a muzzle pattern of the animal with a mobile device equipped with a camera and installed with an application;

holding the mobile device camera over the muzzle of the animal;

capturing the muzzle pattern using the mobile device camera; and viewing a processed image of the muzzle pattern in the mobile device using the mobile application, wherein the processed image of the muzzle pattern comprises an editable record and a matching record.

17. The method of claim 16, wherein the mobile device is connected to an internet network.

\* \* \* \* \*